C. LE R. DILLINGER.
HANDLE.
APPLICATION FILED OCT. 26, 1916.
1,217,287.
Patented Feb. 27, 1917.
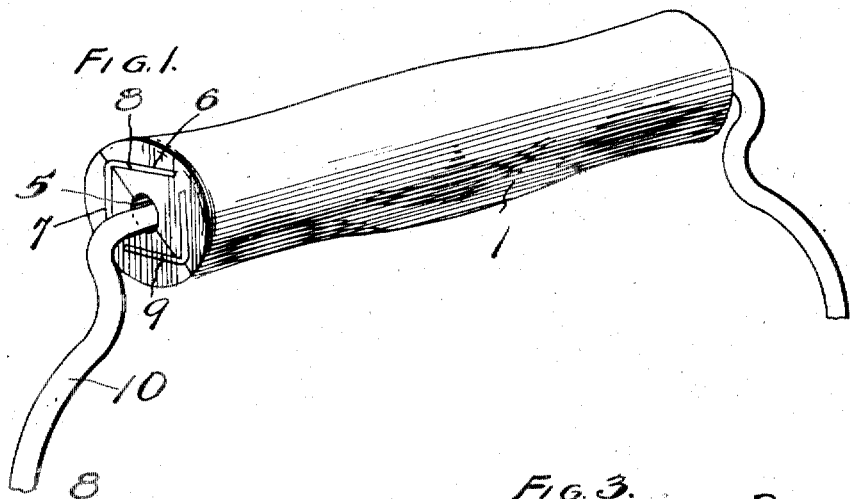
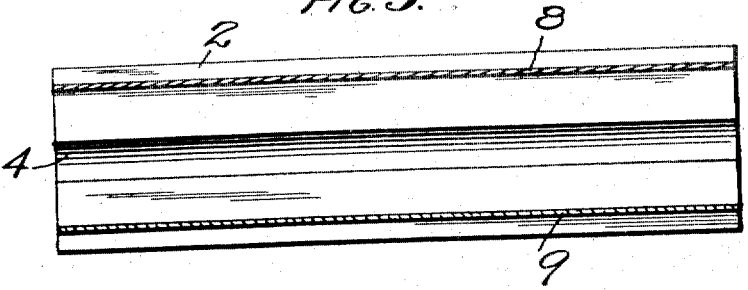
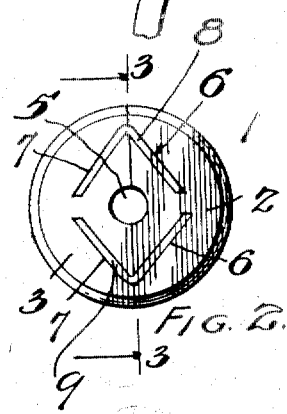
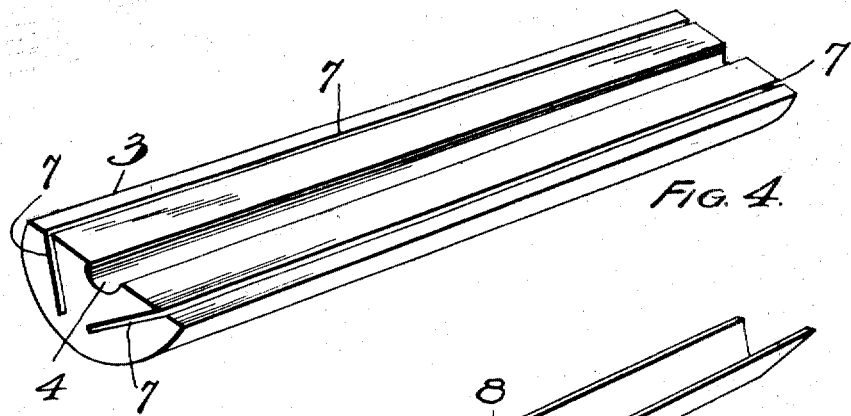
INVENTOR
CUTHBERT LE ROY DILLINGER
Herman A. Phillips
ATTORNEY.

UNITED STATES PATENT OFFICE.

CUTHBERT LE ROY DILLINGER, OF TITUSVILLE, PENNSYLVANIA.

HANDLE.

1,217,287.  Specification of Letters Patent.  Patented Feb. 27, 1917.

Application filed October 26, 1916. Serial No. 127,869.

*To all whom it may concern:*

Be it known that I, CUTHBERT LE ROY DILLINGER, a citizen of the United States of America, residing at Titusville, in the county of Crawford and State of Pennsylvania, have invented a new and useful Improvement in Handles, of which the following is a specification.

The present invention relates to improvements in handles, especially adapted for use in connection with kitchen, stove, and other utensils, and provides an attachable insulated handle or grip by means of which these utensils may be handled.

The primary object of the invention is the provision of an insulated handle of wood, which will adapt itself to different temperatures, in order that cracking or swelling of the wooden handle may be prevented, and to provide a comparatively inexpensive, but durable and efficient handle for the purpose set forth.

The invention consists in certain novel combinations and arrangements of parts as will be hereinafter more fully described and claimed.

In the accompanying drawings I have illustrated one complete example of the physical embodiment of my invention, constructed according to the best mode I have so far devised for the practical application of the principles of my invention, but it will be understood that colorable changes or alterations may be made in my invention without departing from the spirit of the appended claim.

Figure 1 is a perspective view showing a handle of my invention used in conjunction with the metal bail of a kitchen utensil.

Fig. 2 is an end view of the handle, detached.

Fig. 3 is a longitudinal sectional view on line 3—3 of Fig. 2.

Fig. 4 is a perspective view of one section of the handle.

Fig. 5 is a perspective view of one of the locking angle plates.

In the preferred embodiment of my invention, as illustrated in the drawings, the handle which is designated as 1 is of a shape and size to conform to the standard types of handles of this character, and the handle is made up of two longitudinal sections, as 2 and 3. These sections are of wood having a flat face, and the usual rounded outside surfaces, and a central longitudinal groove 4 extends from end to end of each section to form a bore or cylindrical opening 5 extending through the handle 1.

Each handle section is provided with a pair of kerfs or slots as 6, 6 and 7, 7 which are cut in the body of each section upon a line tangential to the circumference of the handle; and these slots or kerfs are each open at the flat face of the handle sections, and when the two sections are brought together the openings in the pairs of slots register with each other, as indicated in Fig. 2. The two sections 2 and 3, are held together by means of a pair of locking wedges in the form of V-shape metallic angle plates 8 and 9. These wedges are made of angle plate, preferably of metal, and the angle as shown in the drawing is approximately ninety degrees, although this particular angle may be departed from if desired. Each wedge is as long as the handle sections, and the flanges of the wedges fit neatly and tightly in the adjoining kerfs of the two sections 2 and 3, as clearly indicated in Figs. 1 and 2.

In the production of the handle, a blank piece of wood is first turned to the desired shape for the hand grasping portion of the handle, and then said blank is bored through its center to provide the opening 5. The bored blank is then sawed in halves, the saw cutting through the blank longitudinally, and thus the two sections 2 and 3 with their respective grooves 4, are provided. The sections are now sawed to provide the kerfs 6, 6, 7, 7, and then the sections may be assembled around the straight portion of the bail 10, and the locking wedges 8 and 9 are forced into the adjoining pairs of kerfs 6, 7, and the two wooden sections are thus firmly locked together, and the handle 1 is loosely retained in the bail 10.

The metallic wedges reinforce the handle 1, and permit the handle to expand and contract according to the difference in temperature. It will be understood that the metal in the wedges permits expansion of the wooden handle, and this fact allows the handle to expand and contract without danger of warping, or cracking the wooden handle portion, thus increasing its durability, and increasing the life of the utensil itself to which the handle is applied.

What I claim is:

A wooden handle comprising a pair of wooden sections formed with alined central grooves and adjoining flat faces, a pair of angularly disposed kerfs in each section ing openings registering with those i] opposite section, and a V-shaped angle retained in each pair of registering ker:

In testimony whereof I affix my signa

CUTHBERT LE ROY DILLING]